US012571974B2

(12) United States Patent
Qin et al.

(10) Patent No.: US 12,571,974 B2
(45) Date of Patent: Mar. 10, 2026

(54) ADAPTER, CONNECTOR, AND OPTO-ELECTRIC TRANSMISSION ASSEMBLY

(71) Applicants: Fujin Precision Industrial (Jincheng)Co., Ltd., Jincheng (CN); HON HAI PRECISION INDUSTRY CO., LTD., New Taipei (TW)

(72) Inventors: Yun-Yun Qin, Jincheng (CN); Ya-Peng Wang, Jincheng (CN); Jian-Bo Yang, Jincheng (CN); Chong-Cong Li, Jincheng (CN); Hai-Tao Jing, Jincheng (CN)

(73) Assignees: Fujin Precision Industrial (Jincheng)Co., Ltd., Jincheng (CN); HON HAI PRECISION INDUSTRY CO., LTD., New Taipei (TW)

( * ) Notice: Subject to any disclaimer, the term of this patent is extended or adjusted under 35 U.S.C. 154(b) by 210 days.

(21) Appl. No.: 18/196,427

(22) Filed: May 11, 2023

(65) Prior Publication Data

US 2024/0210640 A1     Jun. 27, 2024

(30) Foreign Application Priority Data

Dec. 27, 2022    (CN) ......................... 202211687199.0

(51) Int. Cl.
*H04B 10/00*        (2013.01)
*G02B 6/38*        (2006.01)
(Continued)

(52) U.S. Cl.
CPC ......... *G02B 6/4284* (2013.01); *G02B 6/3858* (2013.01); *G02B 6/4278* (2013.01); *H01B 11/22* (2013.01)

(58) Field of Classification Search
CPC .. G02B 6/4284; G02B 6/3858; G02B 6/4278; G02B 6/3825; G02B 6/3817; G02B 6/38;
(Continued)

(56) References Cited

U.S. PATENT DOCUMENTS 5,299,956 A * 4/1994 Brownell ........... H01R 13/6469
                                        439/894
6,165,023 A * 12/2000 Troutman .......... H01R 13/6474
                                        439/676
(Continued)

FOREIGN PATENT DOCUMENTS

CN        111025490 A      4/2020

*Primary Examiner* — Agustin Bello
(74) *Attorney, Agent, or Firm* — ScienBiziP, P.C.

(57)        ABSTRACT

An adapter is configured to connect to a connector. The adapter includes a first housing and an electrical connector. The first housing is defined a first accommodating groove and a through hole communicating with each other. The electrical connector includes an electrical connecting portion, a supporting portion, and an elastic portion. The supporting portion connects the electrical connecting portion to the elastic portion. The supporting portion is accommodated in the through hole, and the electrical connecting portion extends through the first housing; the elastic portion extends from the supporting portion toward the first accommodating groove; the elastic portion is configured to be bent relative to the supporting portion, and the elastic portion is configured to electrically connect to a terminal. The present disclosure provides a connector and an opto-electric transmission assembly.

7 Claims, 10 Drawing Sheets

200

(51) Int. Cl.
    *G02B 6/42*         (2006.01)
    *H01B 11/22*      (2006.01)

(58) Field of Classification Search
    CPC .. G02B 6/3807; G02B 6/3826; G02B 6/3833;
                  G02B 6/3835; G02B 6/3869; G02B
               6/3873; G02B 6/42; G02B 6/4256; H01B
               11/22; H01R 4/18; H01R 13/02; H01R
                             13/11; H01R 13/502
    See application file for complete search history.

(56)             References Cited

U.S. PATENT DOCUMENTS

| | | | | |
|---|---|---|---|---|
| 6,371,793 | B1 * | 4/2002 | Doorhy | H01R 13/6469 |
| | | | | 439/676 |
| 6,379,157 | B1 * | 4/2002 | Curry | H01R 13/6464 |
| | | | | 439/676 |
| 6,416,364 | B1 * | 7/2002 | Shi | H01R 24/64 |
| | | | | 439/680 |
| 6,497,588 | B1 * | 12/2002 | Scharf | H01R 24/64 |
| | | | | 439/607.38 |
| 6,579,128 | B1 * | 6/2003 | Wu | H01R 24/64 |
| | | | | 439/676 |
| 6,966,798 | B1 * | 11/2005 | Wu | H01R 13/64 |
| | | | | 439/680 |
| 8,298,922 | B2 * | 10/2012 | Schumann | H01R 13/502 |
| | | | | 438/467 |
| 8,690,593 | B2 * | 4/2014 | Anderson | G02B 6/3825 |
| | | | | 439/660 |
| 8,979,574 | B2 * | 3/2015 | Daily, Jr. | H01R 4/2433 |
| | | | | 439/676 |
| 9,063,298 | B2 * | 6/2015 | Coffey | G02B 6/3895 |
| 9,075,205 | B2 * | 7/2015 | Pepe | G02B 6/3895 |
| 9,219,543 | B2 * | 12/2015 | Smith | H04Q 11/0066 |
| 9,244,229 | B2 * | 1/2016 | Petersen | G02B 6/387 |
| 9,379,501 | B2 * | 6/2016 | Taylor | G02B 6/4292 |
| 9,419,393 | B2 * | 8/2016 | Guitard | H01R 13/6594 |
| 9,453,971 | B2 * | 9/2016 | Anderson | G02B 6/3825 |
| 9,470,742 | B2 * | 10/2016 | Coffey | G02B 6/3817 |
| 9,500,814 | B2 * | 11/2016 | Pepe | H01R 12/7076 |
| 9,625,658 | B1 * | 4/2017 | Lin | G02B 6/3879 |
| 9,798,096 | B2 * | 10/2017 | Ogren | G02B 6/3825 |
| 9,985,359 | B2 * | 5/2018 | Jarzebiak | H01R 24/64 |
| 10,048,446 | B2 * | 8/2018 | Kelly | G02B 6/38 |
| 10,103,498 | B2 * | 10/2018 | Maesoba | H01R 13/65912 |
| 10,302,874 | B2 * | 5/2019 | Tong | G02B 6/3877 |
| 10,401,574 | B2 * | 9/2019 | Gurreri | G02B 6/3817 |
| 10,495,826 | B2 * | 12/2019 | Leigh | G02B 6/3893 |
| 10,732,358 | B2 * | 8/2020 | Bretz | H01R 24/64 |
| 10,768,374 | B2 * | 9/2020 | Gurreri | G02B 6/3869 |
| 11,215,767 | B2 * | 1/2022 | Holmberg | G02B 6/3821 |
| 2002/0009930 | A1 * | 1/2002 | Chang | H01R 13/64 |
| | | | | 439/677 |
| 2004/0209523 | A1 * | 10/2004 | Milner | H01R 24/64 |
| | | | | 439/676 |
| 2005/0118881 | A1 * | 6/2005 | Aekins | H01R 13/6461 |
| | | | | 439/676 |
| 2005/0136747 | A1 * | 6/2005 | Caveney | H01R 13/665 |
| | | | | 439/676 |
| 2005/0153580 | A1 * | 7/2005 | Schilling | H01R 13/642 |
| | | | | 439/73 |
| 2006/0183359 | A1 * | 8/2006 | Gerber | H01R 4/2429 |
| | | | | 439/76.1 |
| 2007/0202752 | A1 * | 8/2007 | Schumann | H01R 24/64 |
| | | | | 439/676 |
| 2010/0209058 | A1 * | 8/2010 | Ott | G02B 6/475 |
| | | | | 385/101 |
| 2011/0262077 | A1 * | 10/2011 | Anderson | G02B 6/3879 |
| | | | | 385/134 |
| 2011/0300740 | A1 * | 12/2011 | Schumann | H01R 13/5829 |
| | | | | 439/452 |
| 2013/0203282 | A1 * | 8/2013 | Engels | H01R 13/6585 |
| | | | | 439/389 |
| 2016/0266326 | A1 * | 9/2016 | Gniadek | G02B 6/3817 |
| 2017/0102507 | A1 * | 4/2017 | Menguy | G02B 6/4444 |
| 2017/0176690 | A1 * | 6/2017 | Bretz | G02B 6/4479 |
| 2017/0299817 | A1 * | 10/2017 | Huang | G02B 6/36 |
| 2017/0336576 | A1 * | 11/2017 | Bund | G02B 6/3861 |
| 2020/0271861 | A1 * | 8/2020 | Blackwell, Jr. | G02B 6/566 |
| 2020/0341208 | A1 * | 10/2020 | Verheyden | G02B 6/3849 |
| 2021/0093168 | A1 * | 4/2021 | Deyanov | A61B 1/00117 |
| 2023/0375790 | A1 * | 11/2023 | Liu | G02B 6/3874 |
| 2024/0077683 | A1 * | 3/2024 | Zhao | G02B 6/3877 |
| 2024/0210640 | A1 * | 6/2024 | Qin | G02B 6/4278 |
| 2025/0028123 | A1 * | 1/2025 | Hu | G02B 6/3821 |

* cited by examiner

200

ADAPTER, CONNECTOR, AND OPTO-ELECTRIC TRANSMISSION ASSEMBLY

FIELD

The subject matter herein generally relates to optical communication, and more particularly, to an adapter, a connector, and an opto-electric transmission assembly.

BACKGROUND

Optical fibers are widely used in communication networks. In the fiber-to-the-premises (FTTP) network, an optical fiber is routed from a data center to an optical network terminal (ONT) located at subscriber's premise. The optical fiber and the optical network terminal are connected in a connector. Furthermore, the connector also connects to an adapter to realize the transmission of optical signal and electrical signal at the same time. However, the structure of the adapter or the connector is complicated, and the transmission performance of the adapter and the connector is poor. Therefore, there is a room for improvement in the art.

BRIEF DESCRIPTION OF THE DRAWINGS

Implementations of the present technology will now be described, by way of example only, with reference to the attached figures.

DETAILED DESCRIPTION

Figure 1:
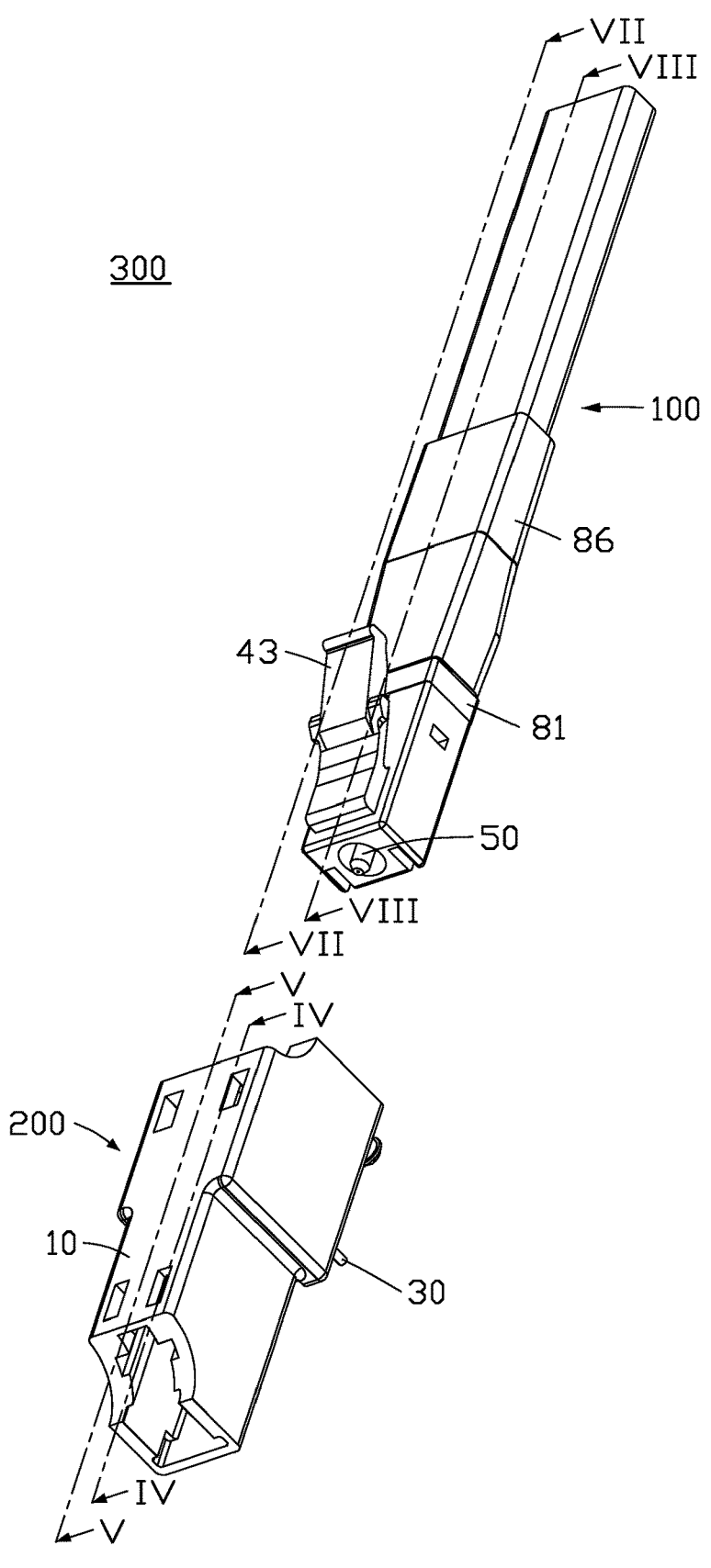
FIG. 1 is a diagrammatic view of an embodiment of an adapter and a connector according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Some embodiments of the present disclosure will be described in detail with reference to the drawings. If no conflict, the following embodiments and features in the embodiments can be combined with each other.

Figure 2:
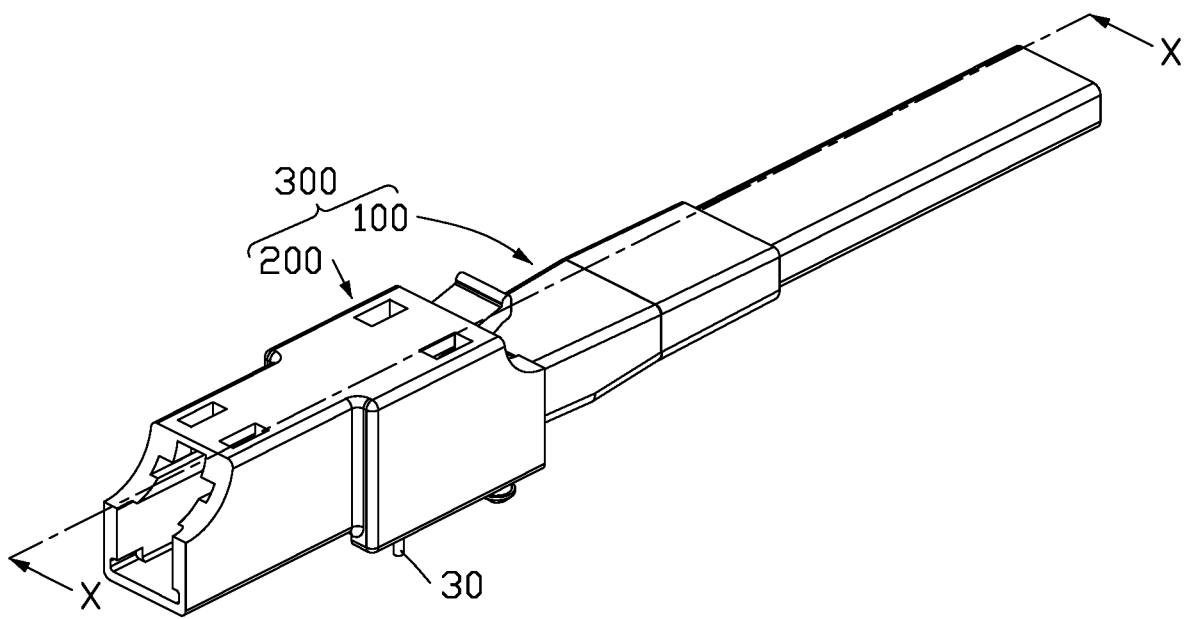
FIG. 2 is a diagrammatic view showing the adapter and the connector of FIG. 1 assembled to form an opto-electric transmission assembly.

Referring to FIGS. 1 and 2, an opto-electric transmission assembly 300 is provided according to an embodiment of the present disclosure. The opto-electric transmission assembly 300 includes an adapter 200 and a connector 100 connected to each other to realize transmission of optical signals and electrical signals. FIG. 1 is a diagrammatic view of the adapter 200 and the connector 100, and FIG. 2 is a diagrammatic view showing the adapter 200 and the connector 100 assembled together. The opto-electric transmission assembly 300 may be applied in fiber-to-the-home (FTTH), fiber-to-the-curb (FTTC), fiber-to-the-building (FTTB), and fiber-to-the-service area (FTTSA).

Figure 3:
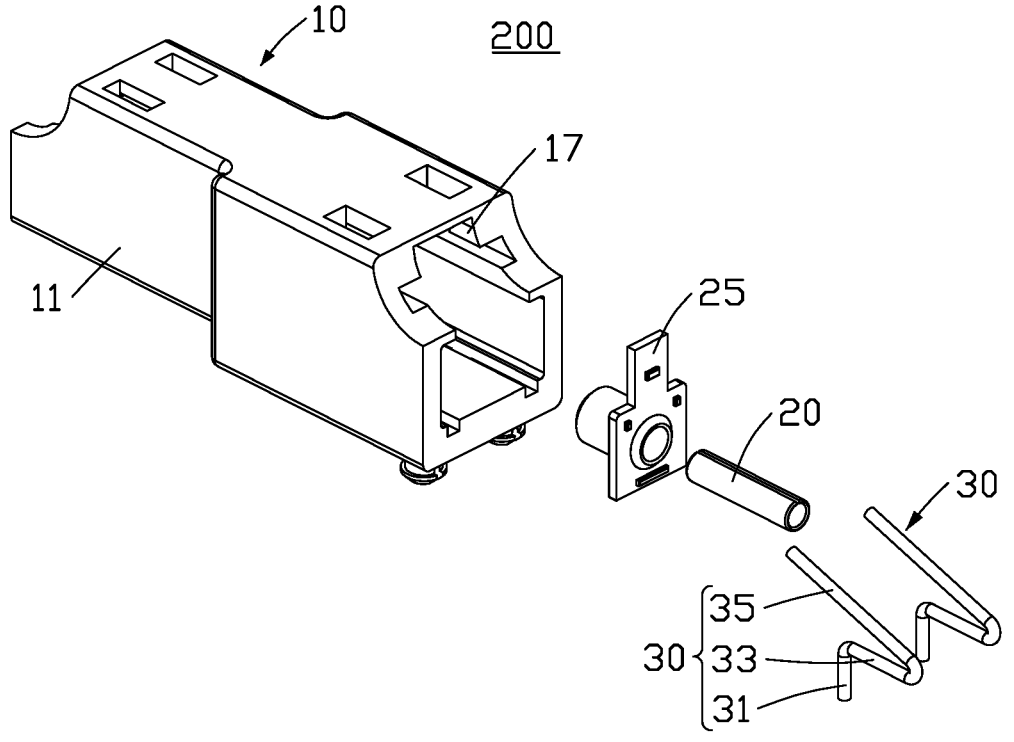
FIG. 3 is an exploded view of the adapter of FIG. 1.

Referring to FIG. 3, the adapter 200 includes a first housing 10, a sleeve 20, a sleeve holder 25, and an electrical connector 30. The sleeve 20, the sleeve holder 25, and the electrical connector 30 are assembled to the first housing 10 as a whole.

Figure 4:
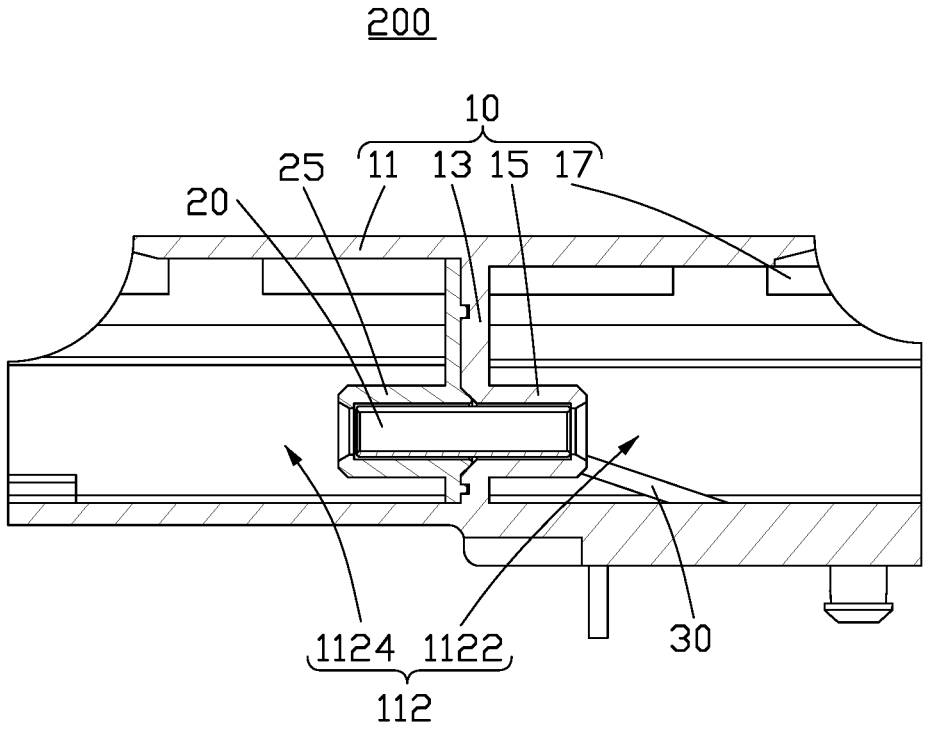
FIG. 4 is a cross-sectional view taken along line IV-IV of FIG. 1.

Referring to FIG. 4, the first housing 10 includes a first housing portion 11, a blocking portion 13, an extending portion 15, and a first clamping portion 17. A first accommodating groove 112 is defined on the first housing portion 11. The first accommodating groove 112 extends through the first housing portion 11 along a length direction of the first housing portion 11. The first accommodating groove 112 includes a first accommodating portion 1122 and a second accommodating portion 1124 communicating with each other. The blocking portion 13 is formed by extending from an inner surface of the first housing portion 11 toward the first accommodating groove 112. The blocking portion 13 separates the first accommodating portion 1122 and the second accommodating portion 1124. The extending portion 15 is formed by extending from a surface of the blocking portion 13 toward the first accommodating portion 1122. The extending portion 15 is hollow and cylindrical. The first clamping portion 17 is disposed at an end of the first housing 10. The first clamping portion 17 is disposed on the first housing portion 11 and extends toward the first accommodating portion 1122.

The sleeve holder 25 is accommodated in the second accommodating portion 1124 and connected to a surface of the blocking portion 13. The sleeve 20 is hollow and cylindrical. One end of the sleeve 20 is accommodated in the sleeve holder 25, and the other end extends to the extending portion 15.

Figure 5:
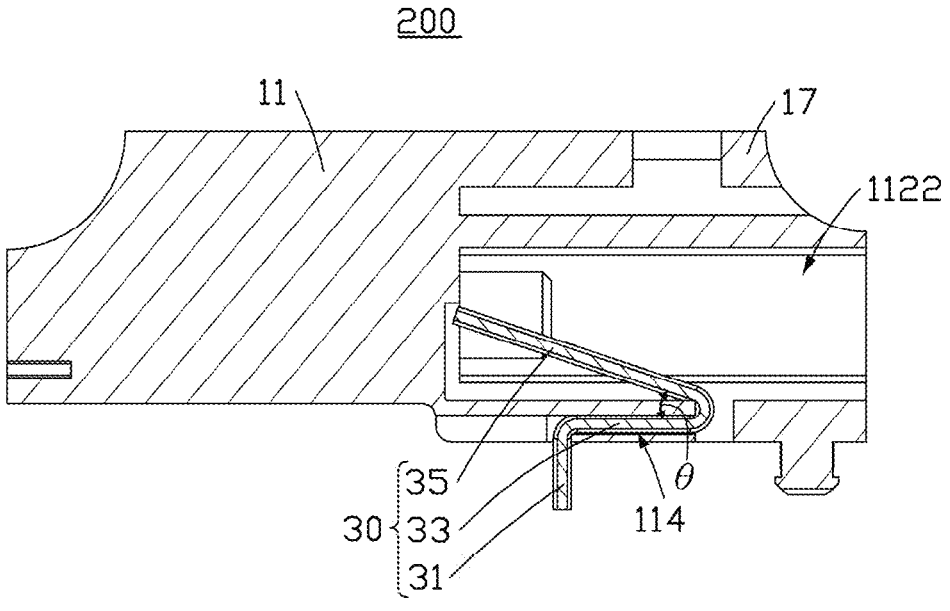
FIG. 5 is a cross-sectional view taken along line V-V of FIG. 1.

Referring to FIG. 5, the electrical connector 30 is made of metal, and the electrical connector 30 is an elastic arm. The electrical connector 30 includes an electrical connecting portion 31, a supporting portion 33, and an elastic portion 35. The supporting portion 33 connects the electrical connecting portion 31 to the elastic portion 35. A through hole 114 is defined on the first housing portion 11. The through hole 114 communicates with the first accommodating portion 1122. The supporting portion 33 extends through the through hole 114 for fixing the electrical connector 30 on the first housing 10. The electrical connecting portion 31 extends from the supporting portion 33 and extends through the first housing portion 11. The electrical connecting portion 31 can electrically connect to an external circuit (e.g., a circuit board). The elastic portion 35 extends from the other end of the supporting portion 33 toward the first accommodating portion 1122. An end of the elastic portion 35 away from the supporting portion 33 extends toward the direction where the blocking portion 13 is disposed. An included angle θ between the elastic portion 35 and the supporting portion 33 is acute angle. The elastic portion 35 can be further bent relative to the supporting portion 33 under an external force.

When assembling the adapter 200, firstly, the electrical connector 30 is installed in the first housing 10. Then the sleeve 20 is accommodated in the first accommodating groove 112, the sleeve holder 25 is accommodated in the second accommodating portion 1124, and one end of the sleeve 20 is accommodated in the sleeve holder 25. Finally, the sleeve holder 25 is welded inside the first housing 10, the adapter 200 is assembled.

Figure 6:
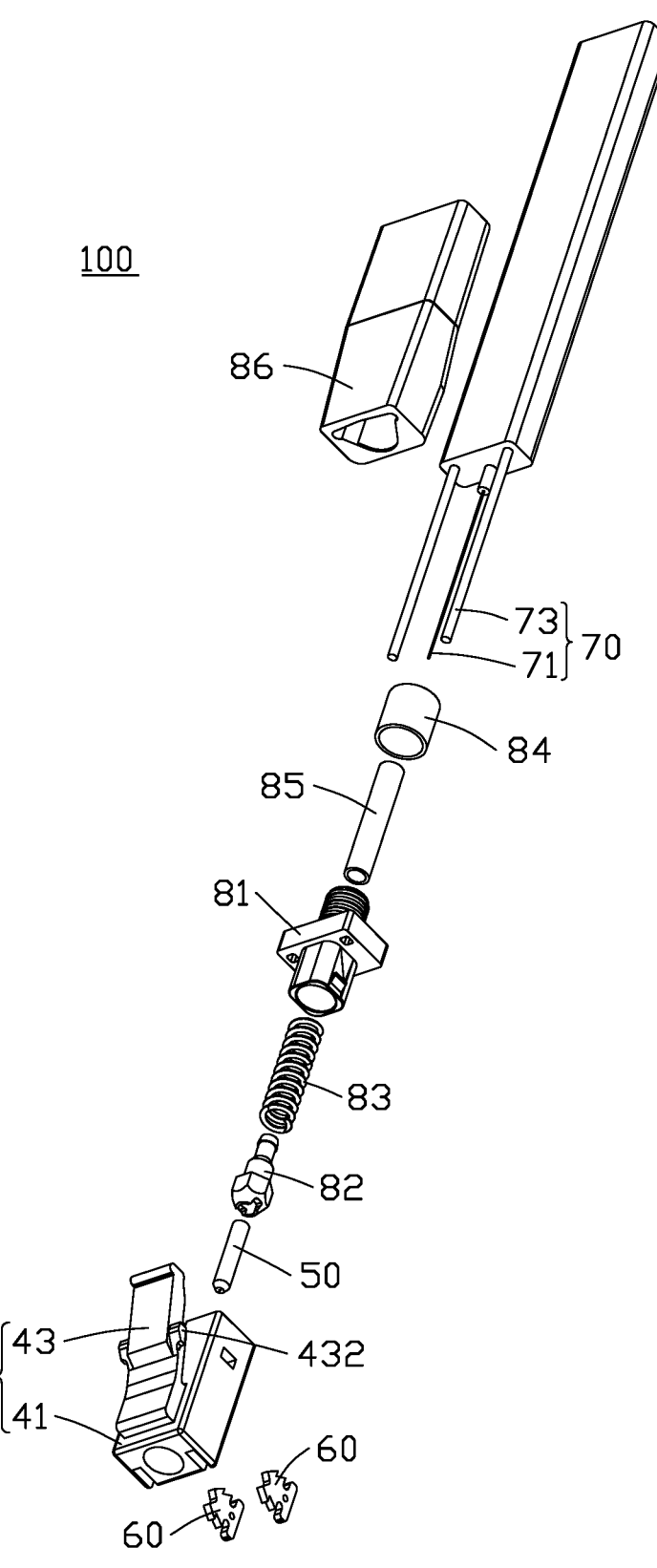
FIG. 6 is an exploded view of the connector of FIG. 1.

Referring to FIG. 6, the connector 100 includes a second housing 40, a ferrule 50, a terminal 60, and a photoelectric composite cable 70.

Figure 7:
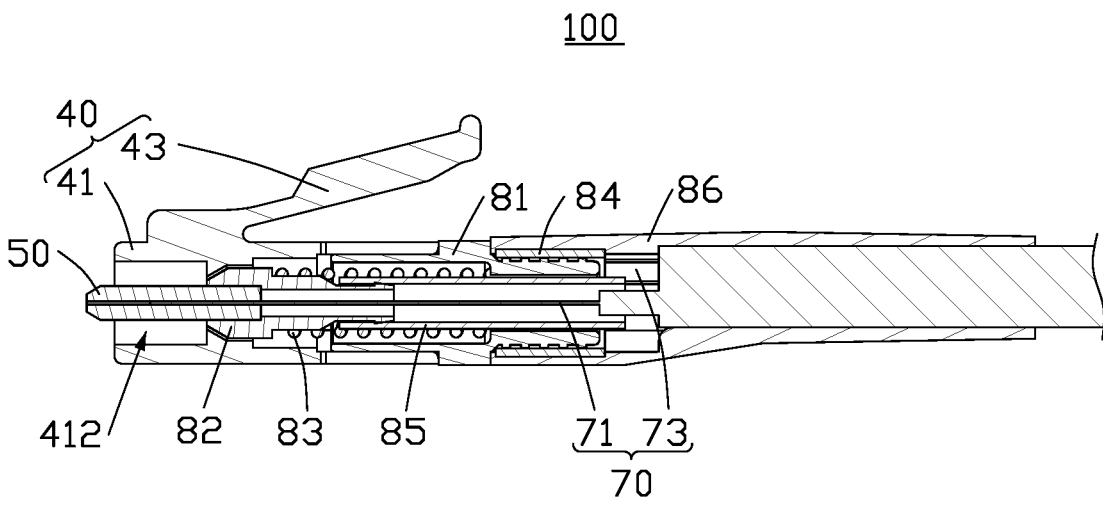
FIG. 7 is a cross-sectional view taken along line VII-VII of FIG. 1.

Referring to FIG. 7, the second housing 40 includes a second housing portion 41 and a pressing portion 43. The pressing portion 43 is disposed on an outer surface of the second housing portion 41. The first protrusion 432 is disposed on the pressing portion 43. The pressing portion 43 can be deformed relative to the second housing portion 41 under an external force, and one end of the second housing portion 41 can be accommodated in the first accommodating groove 112. An interaction between the first protrusion 432 and the first clamping portion 17 enables the second housing 40 to be clamped in the first housing 10.

When one end of the second housing portion 41 is accommodated in the first accommodating groove 112, the first protrusion 432 is clamped on the first clamping portion 17, and the first housing 10 and the second housing 40 are fixed to each other. When the second housing 40 is taken out from the first housing 10, press the pressing portion 43 until the first clamping portion 17 releases the restriction on the first protrusion 432, and the second housing 40 can be taken out from the first housing 10.

A second accommodating groove 412 passing through the second housing portion 41 is defined on the second housing portion 41. The ferrule 50 and the terminal 60 are accommodated in the second accommodating groove 412, and at least portion of the photoelectric composite cable 70 is accommodated in the second accommodating groove 412.

Figure 8:
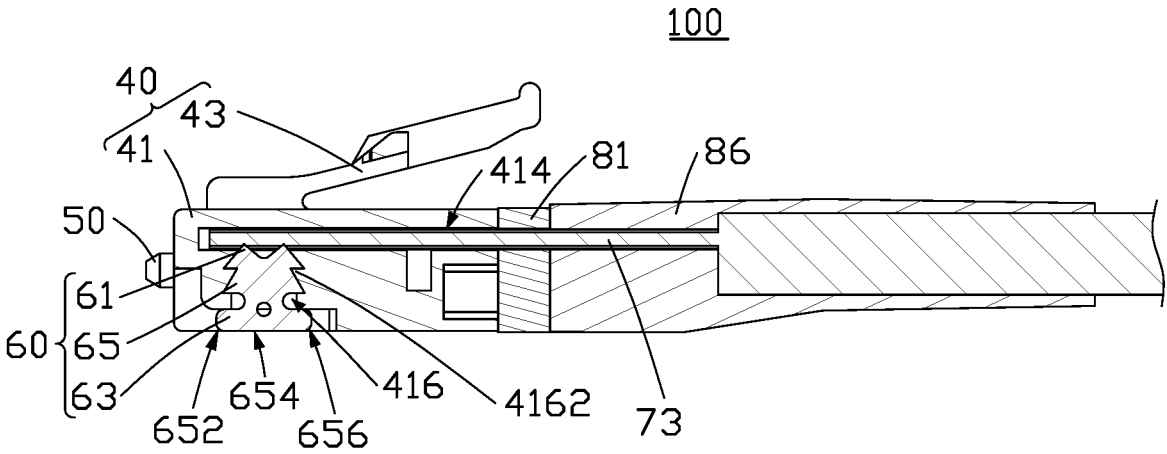
FIG. 8 is a cross-sectional view taken along line VIII-VIII of FIG. 1.

Referring to FIG. 8, the photoelectric composite cable 70 includes an optical fiber 71 and an electric cable 73. One end of the optical fiber 71 is accommodated in the ferrule 50, and one end of the ferrule 50 can be inserted into the sleeve 20, so as to realize a transmission of optical signals between the connector 100 and the adapter 200. A cable slot 414 is defined on the second housing portion 41. The cable slot 414 is spaced apart from the second accommodating groove 412. One end of the electric cable 73 is accommodated in the cable slot 414, and the cable slot 414 is annular. That is, the electric cable 73 are surrounded by a sidewall of the cable slot 414.

A receiving groove 416 communicating with the cable slot 414 is defined on the second housing portion 41. A portion of a surface of the electric cable 73 accommodated in the cable slot 414 is exposed from the receiving groove 416. The receiving groove 416 can receive the terminal 60. One end of the terminal 60 is connected to the electric cable 73 exposed from the receiving groove 416, and the other end can connect the electrical connector 30, so as to realize the transmission of electrical signals.

The terminal 60 includes a first contacting portion 61, a second contacting portion 63, and a second clamping portion 65. The first contacting portion 61 and the second contacting portion 63 are disposed on opposite sides of the terminal 60. The first contacting portion 61 can electrically connect to the electric cable 73, and the second contacting portion 63 is exposed from the receiving groove 416 for electrically connect to the electrical connector 30. The second clamping portion 65 extends from a middle of the terminal 60 toward both sides of the terminal 60, and a direction of the extending is different from a direction in which the terminal 60 is inserted into the receiving groove 416. At least one second protrusion 4162 matched with the second clamping portion 65 is disposed on a sidewall of the receiving groove 416 to fix the terminal 60 in the receiving groove 416.

A surface of the second contacting portion 63 facing away from the first contacting portion 61 includes a first arc surface 652, a plane 654, and a second arc surface 656. The first arc surface 652, the plane 654, and the second arc surface 656 are all exposed from the receiving groove 416. The plane 654 connects the first arc surface 652 to the second arc surface 656. The first arc surface 652 is disposed on an outer side of the second housing 40, and the second arc surface 656 is disposed on an inner side of the second housing. The first arc surface 652 facilitates the insertion of the connector 100 into the adapter 200. The plane 654 facilitates that after the connector 100 is connected to the adapter 200, the terminal 60 and the electrical connector 30 can fully contact, thereby improving the transmission performance of the electrical connection. The second arc surface 656 facilitates removal of the connector 100 from the adapter 200.

Referring to FIGS. 6 and 7, the connector 100 can further include a back shell 81, a handle 82, a spring 83, a collar 84, a protecting tube 85, and a sheath 86.

The back shell 81 connects the second housing 40 to the sheath 86. One end of the back shell 81 is accommodated in the second housing 40, the other end of the back shell 81 is accommodated in the sheath 86, and the collar 84 is sleeved on the back shell 81 and disposed between the back shell 81 and the sheath 86.

The ferrule 50, the handle 82, the optical fiber 71, the spring 83, the protecting tube 85, and the collar 84 are coaxial. One end of the optical fiber 71 extends through the protecting tube 85 and the handle 82 and is accommodated in the ferrule 50. One end of the ferrule 50 is accommodated in the handle 82, and the other end protrudes from the handle 82 so as to be inserted into the sleeve 20. One end of the spring 83 is sleeved on the handle 82 and can abut against the handle 82, and the other end is sleeved in the protecting tube 85. Both the spring 83 and the protecting tube 85 are accommodated in the back shell 81, and the other end of the spring 83 abuts against the inner wall of the back shell 81.

Figure 9:
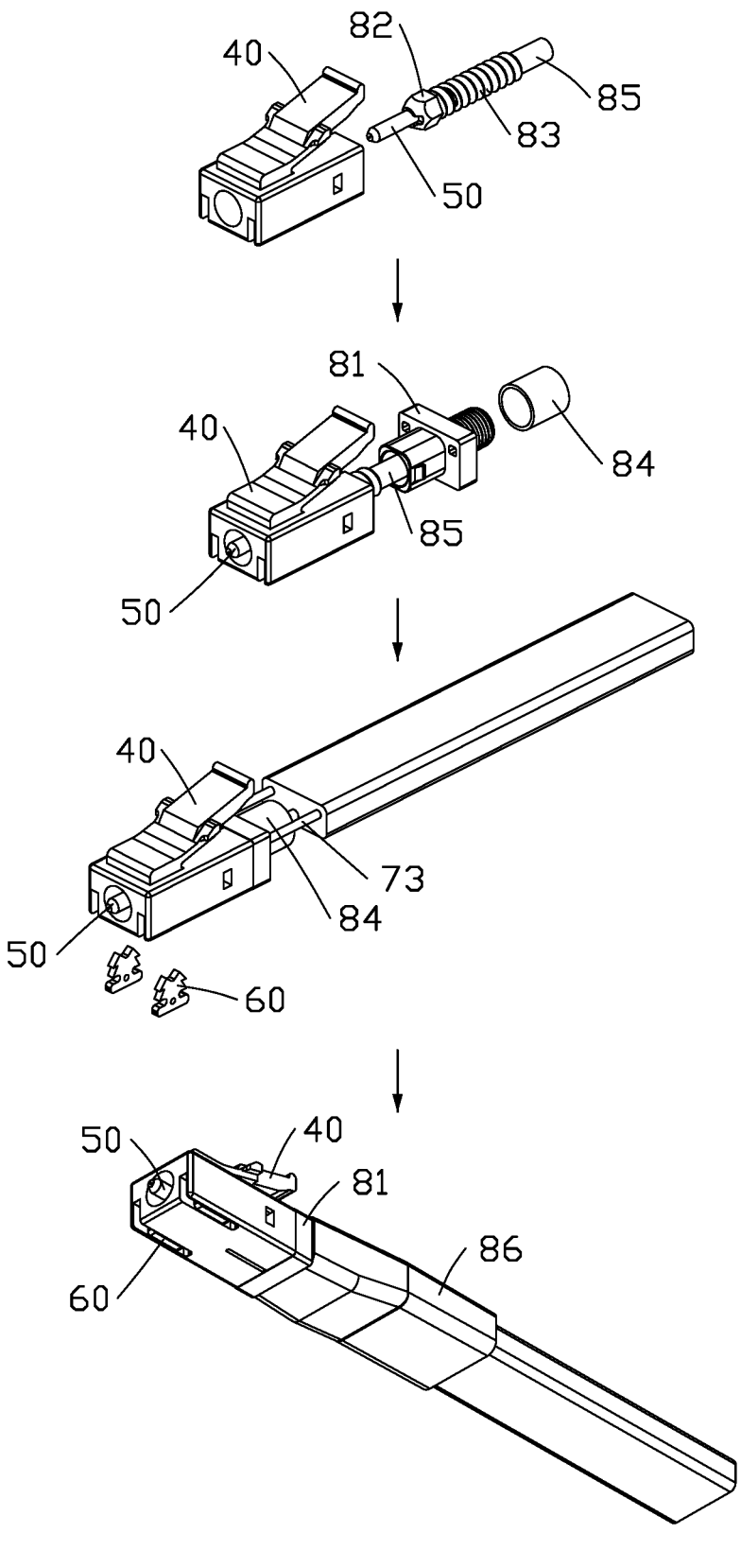
FIG. 9 is a diagrammatic view showing an assembling process of the connector of FIG. 1.

Referring to FIG. 9, when assembling the connector 100, firstly, the ferrule 50, the handle 82, the spring 83, and the protecting tube 85 are disposed coaxially and accommodated in the back shell 81, and the back shell 81 is accommodated in the second housing 40. Then, the collar 84 is sleeved on the rear shell 8, and the optical fiber 71 is sequentially extended through the protecting tube 85, the handle 82 and accommodated in the ferrule 50. Then the electric cable 73 is inserted into the cable slot 414, and a surface of the terminal 60 is exposed from the receiving groove 416. Finally, the sheath 86 is sleeved on the photoelectric composite cable 70 and the sheath 86. The sheath 86 is pushed to cause the back shell 81 abut against the spring 83, and the back shell 81 is clamped on the second housing 40, thereby the connector 100 is assembled.

Figure 10:
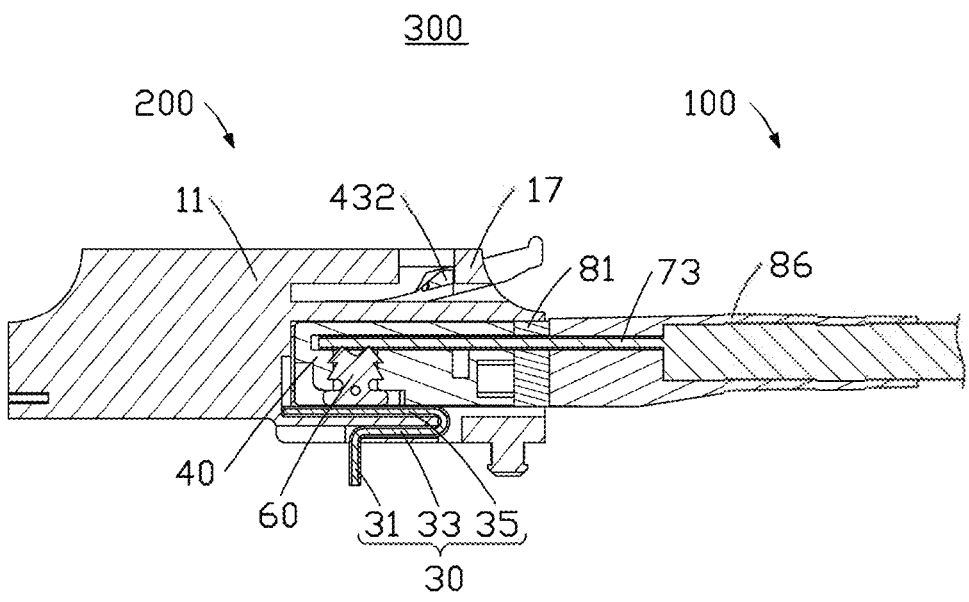
FIG. 10 is a cross-sectional view taken along line X-X of FIG. 2.

Referring to FIG. 10, when inserting the connector 100 into the adapter 200, one end of the second housing 40 is inserted into the first housing 10, and the second housing 40 is first in contact with the electrical connecting portion 31. Then the elastic portion 35 of the electrical connector 30 is pushed down, and the elastic portion 35 moves toward the direction where the supporting portion 33 is disposed. As the second housing 40 gradually enters the first housing 10, the deformation of the elastic portion 35 increases until the plane 654 of the terminal 60 exposed from the receiving groove 416 contacts the elastic portion 35, and then the second housing 40 is further pushed to insert the second housing 40 to a desired position. The electrical connector 30 is interference-fitted with the terminal 60. The ferrule 50 is inserted into the sleeve 20. The first protrusion 432 on the pressing portion 43 and the first clamping portion 17 are engaged with each other, the connector 100 and the adapter 200 are assembled as a whole.

After the connector 100 and the adapter 200 are assembled, the electrical connector 30 is disposed on the side of the optical fiber 71 away from the electric cable 73. That is, the electrical connector 30 and the electric cable 73 are disposed on opposite sides of the optical fiber 71. A movement space of the elastic portion 35 is increased, so that the electrical connector 30 generates enough elastic force due to deformation to resist the terminal 60 for connecting the electrical connector 30 and the electric cable 73, thereby the reliability of the electrical connection is improved.

When disassembling the connector 100 and the adapter 200, press the pressing portion 43 to release the restriction of the first clamping portion 17 on the first protrusion 432, and the second housing 40 is taken out from the first housing 10, so that the connector 100 and the adapter 200 can be separated.

The adapter 200 and the connector 100 provided in the embodiment of the present disclosure, the electrical connector 30 is pressed by the terminal 60, causing the electrical connector 30 to deform, and then the terminal 60 and the electrical connector are interference fit, thereby the electrical signal connection between the adapter 200 and the connector 100 is realized, the adapter 200 and the connector 100 are easily assembly, and the cost is reduced.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A connector is configured to connect to an adapter, the connector comprising:
   a second housing defining a cable slot and a receiving groove, the cable slot and the receiving groove communicating with each other;
   a photoelectric composite cable comprising an electric cable, one end of the electric cable accommodated in the cable slot; and
   a terminal accommodated in the receiving groove, the terminal comprising a first contacting portion, a second contacting portion, and a second clamping portion, wherein the first contacting portion is connected to the electric cable, the second contacting portion is exposed from the receiving groove, the second contacting portion is configured to electrically connect to an electrical connector; a second protrusion is disposed on a sidewall of the receiving groove, the second clamping portion and the second protrusion are configured to match with each other to fix the terminal in the receiving groove;

wherein a surface of the second contacting portion facing away from the first contacting portion comprises a first arc surface, a plane, and a second arc surface, the first arc surface, the plane, and the second arc surface are all exposed from the receiving groove, the plane connects the first arc surface to the second arc surface, the plane is configured to contact with the electrical connector.

2. The connector of claim 1, wherein the second housing comprises a second housing portion, a pressing portion, and at least one first protrusion, the pressing portion is disposed on the second housing portion, the at least one first protrusion is disposed on the pressing portion, the second housing is configured to connect to a first housing of an adapter through the at least one first protrusion.

3. An opto-electric transmission assembly comprising:
   an adapter comprising:
      a first housing defining a first accommodating groove and a through hole, the first accommodating groove and the through hole communicating with each other; and
      an electrical connector comprising an electrical connecting portion, a supporting portion, and an elastic portion, the supporting portion connecting the electrical connecting portion to the elastic portion; the supporting portion accommodated in the through hole, and the electrical connecting portion extending through the first housing; the elastic portion extending from the supporting portion toward the first accommodating groove; an included angle between the elastic portion and the supporting portion is acute angle; and
   a connector comprising:
      a second housing defining a cable slot and a receiving groove, the cable slot and the receiving groove communicating with each other;
      a photoelectric composite cable comprising an electric cable, one end of the electric cable accommodated in the cable slot; and
      a terminal accommodated in the receiving groove, the terminal comprising a first contacting portion, a second contacting portion, and a second clamping portion, wherein the first contacting portion is connected to the electric cable, the second contacting portion is exposed from the receiving groove; the second contacting portion is configured to cause the elastic portion to move toward a direction where the supporting portion is disposed, and further configured to electrically connect to the elastic portion; a second protrusion is disposed on a sidewall of the receiving groove, the second clamping portion and the second protrusion are configured to match with each other to fix the terminal in the receiving groove;
      wherein a surface of the second contacting portion facing away from the first contacting portion comprises a first arc surface, a plane, and a second arc surface, the first arc surface, the plane, and the second arc surface are all exposed from the receiving groove, the plane connects the first arc surface to the second arc surface, the plane is configured to be in contact with the elastic portion.

4. The opto-electric transmission assembly of claim 3, wherein the first housing comprises a first housing portion and a blocking portion, the first accommodating groove is defined on the first housing portion, the blocking portion is accommodated in the first accommodating groove, and the elastic portion extends toward the blocking portion.

5. The opto-electric transmission assembly of claim 4, wherein the adapter further comprises a sleeve and a sleeve holder; the first housing further comprises an extending portion; the blocking portion divides the first accommodating groove into a first accommodating portion and a second accommodating portion communicating with each other; the extending portion is formed by extending from the blocking portion toward the first accommodating portion; one end of the sleeve is accommodated in the sleeve holder, and the other end of the sleeve extends to the extending portion.

6. The opto-electric transmission assembly of claim 4, wherein the first housing further comprises a first clamping portion, the first clamping portion is disposed on the first housing portion and extends toward the first accommodating portion; the second housing comprises a second housing portion, a pressing portion, and at least one first protrusion, the pressing portion is disposed on the second housing portion, the at least one first protrusion is disposed on the pressing portion; the first housing is configured to connect to the second housing through the first clamping portion and the at least one first protrusion.

7. The opto-electric transmission assembly of claim 3, wherein the photoelectric composite cable further comprises an optical fiber, the electrical connector is disposed on a side of the optical fiber away from the electric cable.

* * * * *